United States Patent [19]

Shimmell

[11] Patent Number: 4,867,461
[45] Date of Patent: Sep. 19, 1989

[54] GASKET SEALING SYSTEM

[75] Inventor: Dennis S. Shimmell, Sheboygan, Wis.

[73] Assignee: J. L. French Corporation, Sheboygan, Wis.

[21] Appl. No.: 162,123

[22] Filed: Mar. 1, 1988

[51] Int. Cl.$^4$ .............................................. F16J 15/00
[52] U.S. Cl. ...................................... 277/166; 277/180
[58] Field of Search .................... 277/235 B, 180, 166, 277/189; 411/366, 367, 368, 369, 370, 915; 220/87 R

[56] References Cited

U.S. PATENT DOCUMENTS

| | | | |
|---|---|---|---|
| 765,139 | 7/1904 | Hirsch | 411/368 |
| 1,204,688 | 11/1916 | Rude | 411/367 |
| 2,639,832 | 5/1953 | Bergstrom | 277/189 |
| 2,745,521 | 5/1956 | White | 277/166 |
| 3,130,628 | 4/1964 | Blinn | 411/367 |
| 3,160,054 | 12/1964 | Cohen et al. | 277/166 |
| 3,286,577 | 11/1966 | Weidner, Jr. | 277/180 |
| 3,519,279 | 7/1970 | Wagner | 277/166 |
| 3,643,968 | 2/1972 | Horvath | 277/180 |
| 3,835,615 | 9/1974 | King, Jr. | 403/408.1 |
| 4,140,323 | 2/1979 | Jacobs | 277/235 B |
| 4,211,205 | 7/1980 | Lockhart | 277/235 B |
| 4,214,444 | 7/1980 | Fujioka et al. | 277/235 B |
| 4,334,599 | 6/1982 | Ritsema | 188/73.45 |
| 4,435,112 | 3/1984 | Becker | 411/368 |
| 4,456,268 | 6/1984 | Penn et al. | 277/180 |
| 4,524,979 | 6/1985 | Bauder | 277/189 |
| 4,535,990 | 8/1985 | Yamada | 273/173 |
| 4,602,125 | 7/1986 | West et al. | 174/138 G |
| 4,730,836 | 3/1988 | Miller et al. | 277/235 B |

FOREIGN PATENT DOCUMENTS 969871 12/1950 France .............................. 277/235 B Primary Examiner—William A. Cuchlinski, Jr.
Assistant Examiner—Hohenshell Jeff
Attorney, Agent, or Firm—Fleit, Jacobson, Cohn, Price, Holman & Stern

[57] ABSTRACT

A gasket is provided including tubular nipples projecting outwardly from one side thereof for reception through mounting flange bores of an article of manufacture to which the gasket is to be secured prior to the article being shipped to an assembly point at which the article is to be bolted to a support structure therefor by mounting bolts secured through the bores and anchored relative to the mounting structure. The tubular nipples include inner sleeves whose ends corresponding to the outer ends of the nipples are constructed of ductile material and the sleeves are at least frictionally retained within the nipples. After the nipples are passed through the mounting bolt bores in an associated article of manufacture, the ductile ends of the inner sleeves are swedged over those surface portions of the article of manufacture disposed about the mounting bolt bores. The inner sleeves function to limit compression of the gasket by the associated mounting bolts and the article of manufacture, when bolt mounted to the support structure therefor, is mounted against vibration transmission between the article of manufacture and the support structure.

7 Claims, 1 Drawing Sheet

U.S. Patent  Sep. 19, 1989  4,867,461
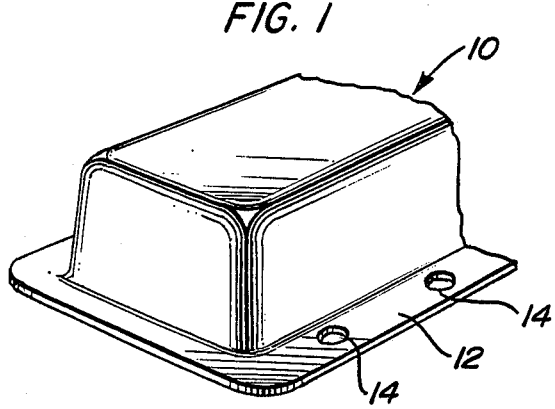
FIG. 1
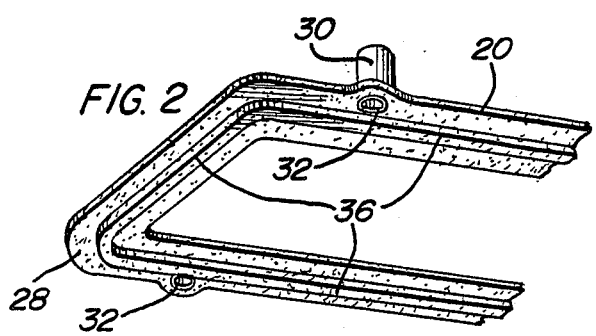
FIG. 2
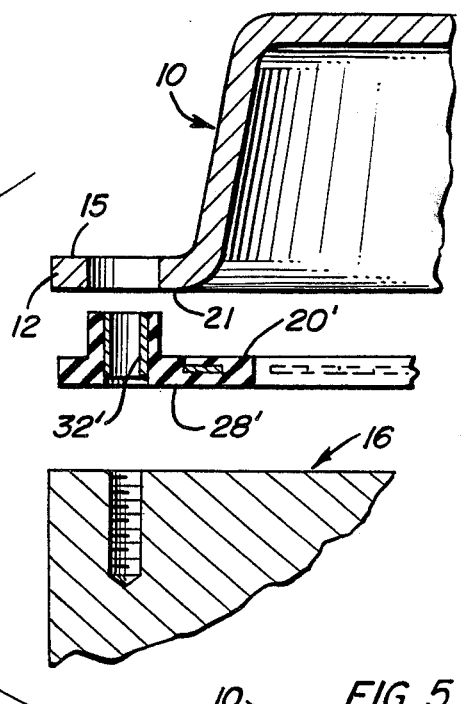
FIG. 4
FIG. 5
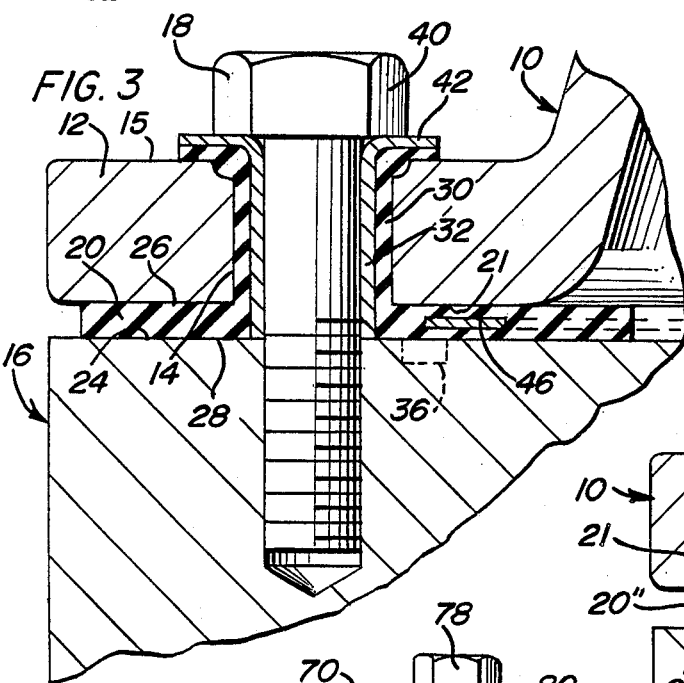
FIG. 3
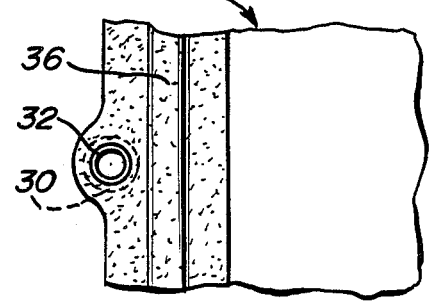
FIG. 6
FIG. 7
PRIOR ART

GASKET SEALING SYSTEM

BACKGROUND OF THE INVENTION

1. Field of the Invention

This invention resides in the provision of a resilient gasket and the mounting of the gasket in correct position upon a manufactured product ultimately to be mounted upon and sealed relative to a support structure for the product through the utilization of mounting bolts extending through mounting flange portions of the product as well as underlying portions of the gasket and threadedly engaged in threaded bores formed in the support structure. The gasket is mounted upon the manufactured product in a manner which coacts with the mounting bolts to limit compression of the gasket and vibration isolate the product relative to the mounting bolts and support structure.

2. Description of Related Art

Various different forms of gasket sealing systems including some of the general structural and operational features of the instant invention heretofore have been provided. Examples of these gasket sealing systems are disclosed in U.S. Pat. Nos. 765,139, 1,204,688, 2,639,832, 2,745,521, 3,130,628, 3,160,054, 3,286,577, 3,519,279, 3,835,615, 4,211,205, 4,334,599, 4,435,112, 4,524,979, 4,535,996 and 4,602,125. However, these previous gasket sealing systems do not include the overall combination of structural features incorporated in the instant invention nor do any of these prior systems include all of the functional advantages of the gasket sealing system of the instant invention.

SUMMARY OF THE INVENTION

The gasket sealing system of the instant invention incorporates a resilient gasket for mounting between opposing sealing surface portions of a manufactured product and the ultimate support surface for the product. The gasket includes first and second sides for opposing the sealing surfaces of the product and the support structure, respectively, and the gasket includes integral hollow tubular nipples projecting outwardly from the first side thereof for telescopic reception in mounting bolt bores provided in the manufactured product. In addition, the nipples include interior sleeves at least frictionally supported therein constructed of ductile material and the gasket is initially applied to the product with the ends of the sleeves remote from the second side of the gasket projecting outwardly of the corresponding ends of the mounting bores, and the corresponding ends of the sleeves are then swedged over the surfaces of the product surrounding those bore ends with either corresponding end portions of the tubular nipples or resilient washers disposed about and interposed between the swedged over ends of the sleeves and the opposing product surfaces.

The main object of this invention is to provide a sealing system for a manufactured product and which incorporates a gasket that may be readily assembled and secured to a manufactured product by using simplified and automated production equipment.

Another object of this invention is to provide a sealing system in accordance with the preceding object and which may be conveniently shipped from a supplier to the ultimate user with the sealing system and product interconnected as an integral unit.

Still another important object of this invention is to provide a sealing system which coacts with shank-type fasteners ultimately utilized to secure a product and the sealing system to a support structure for vibration isolation of the product relative to the support structure and shank-type fasteners.

Another object of this invention is to provide a sealing system in accordance with the preceding objects which also will function to limit compression of the gasket portion of the sealing system during tightening of the shank-type fasteners utilized to mount the product to the support structure therefor.

Yet another object of this invention is to provide a sealing system which also will function to more evenly distribute the tension forces of the attaching shank-type fasteners ultimately used to mount the product to the support structure therefor.

Yet another object of this invention is to provide a sealing system for a manufactured product and including structural and operational features enabling the use of conventional and economical fasteners in securing the product to a support structure therefor.

A further object of this invention is to provide a gasket sealing system which also functions as a vibration isolation system independent of the use of separation isolation grommets.

Another very important object of this invention is to provide a gasket sealing system including structural and operational features which, after a product equipped with the sealing system has been mounted to a support structure therefor through the utilization of conventional threaded-type fasteners, functions to accomplish torque retention of the fasteners.

A final object of this invention to be specifically enumerated herein is to provide a gasket sealing system in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of an article of manufacture comprising a typical engine rocker arm cover.

FIG. 2 is a fragmentary perspective view of a gasket constructed in accordance with the instant invention.

FIG. 3 is a fragmentary enlarged vertical sectional view illustrating the rocker arm cover and gasket mounted on an associated engine cylinder head.

FIG. 4 is an exploded fragmentary vertical sectional view of the rocker arm cover, gasket and cylinder head before assembly thereof, but showing a modified form of gasket.

FIG. 5 is a fragmentary enlarged bottom plan view of the gasket illustrated in FIG. 2.

FIG. 6 is a fragmentary enlarged vertical sectional view similar to FIG. 3, but illustrating a second modified form of gasket.

FIG. 7 is an enlarged fragmentary vertical sectional view similar to FIG. 3, but illustrating prior art.

DESCRIPTION OF THE PREFERRED EMBODIMENT

Referring now more specifically to the drawings, the numeral 10 generally designates a typical manufactured product or component assembly such as a rocker arm cover (valve cover) of an internal combustion engine provided with overhead valves. The cover includes a mounting flange 12 equipped with mounting bolt receiving bores 14 formed therethrough opening through oppositely facing, generally parallel surfaces 15 and 21 of the flange 12.

The product 10 usually is mounted upon a support structure such as a cylinder head illustrated in FIG. 3 and referred to in general by the reference numeral 16 through the utilization of mounting bolts 18 and with a generally planar gasket 20 interposed between the opposing first and second sealing surfaces 22 and 24 of the product 10 and cylinder head 16, respectively.

In accordance with the present invention the gasket 20 is constructed of a resilient, deformable material such as silicone and includes first and second sides 26 and 28 opposing the surfaces 21 and 24. The gasket 20 also includes integral sleeve or tubular nipple portions 30 projecting outwardly from the side 26 thereof and received through the bores 14. Further, a ductile material inner sleeve 32 is disposed and at least frictionally retained within each tubular nipple or sleeve portion 30 and projects through the corresponding bore 14.

From FIG. 3 of the drawings it may be seen that corresponding ends of the tubular nipples 30 and the inner sleeves 32 project fully through the bores 14 and after the gasket 20 has been applied to the product 10 the ends of the inner sleeves 32 remote from the surface 21 of the product 10 are swedged over those surface portions of the flange 12 disposed about the ends of the bores 14 remote from the surface 21. In addition, the gasket 20 includes integral rib areas 36 extending thereabout and projecting outwardly of the side 28 thereof for establishing a fluid tight seal between the surfaces 22 and 24 upon the bolts 18 being tightened. The rib areas, upon tightening of the bolts 18, are of course compressed so that the thickness of the gasket 20 in those areas of the gasket equipped with the rib areas 36 is only slightly less than the originally lesser thick gasket portions not equipped with the rib areas 36.

From FIG. 3 of the drawings it may be seen that the first ends of the inner sleeves 32 opposing the surface 24 are abutted thereagainst. Thus, the inner sleeves 32 coact with the heads 40 of the bolts 18 at the swedged ends 42 of the inner sleeves 32 to limit compression of the gasket 20. Also, the swedged over ends 42 serve to more evenly distribute the tension forces of the bolts 18 over the flange 12.

From FIG. 3 of the drawings, it also may be seen that the construction of the sealing system comprising the gasket and the inner sleeves 32 enables the product 10 to be mounted from the cylinder head 16 in a vibration isolated manner. Further, it may be seen from FIG. 3 of the drawings that the gasket 20 may include a central carrier core or frame 46, if desired.

The gasket 20, including its integral tubular nipples 30, may be formed by simple manufacturing methods and readily assembled relative to the product 10 by simple, automated manufacturing machinery. Then, the inner sleeves 32 may be simultaneously swedged in the manner illustrated in FIG. 3 to mechanically lock the gasket 20 to the product 10, the inner sleeves 32 being at least frictionally retained within the tubular nipples 30. Thereafter, the manufactured product 10 may be shipped to an engine assembly plant for ready positioning relative to the cylinder head 16 comprising the ultimate support structure therefor and simplified automated machinery may be used to install and tighten the bolts 18.

With attention now invited more specifically to FIG. 4, it may be seen that if a gasket 20' is not provided with rib areas corresponding to the rib areas 36, inner sleeves 32' corresponding to the inner sleeves 32 may terminate a spaced distance from the side 28' of the gasket 20' corresponding to the side 28. In this manner, upon the tightening of bolts corresponding to bolts 18 during assembly of the product 10 to the, cylinder head 16 controlled compression of the gasket 20' still will be maintained.

From FIG. 5 of the drawings it may be seen that the rib areas 36 are spaced inwardly of the tubular nipples and, accordingly, that the primary sealing between the product 10 and a support structure such as the cylinder head 16 will occur inwardly of the mounting bolts.

With attention now invited more specifically to FIG. 6 of the drawings, there may be seen a second modified form of gasket 20". With the gasket 20", the tubular nipples 30" terminate inwardly of the ends of the bores 14 remote from the surface 21 and resilient washers 46 are disposed about the ends of the inner sleeves 32" projecting outwardly of the ends of the bores 14 remote from the surface 21. Thereafter, the outwardly extending ends of the inner sleeves 32" are swedged as at 42" over the washers 46. In addition, the ends of the inner sleeves 32" remote from the swedged ends 42" are flanged as at 48 and recessed within the side 28" of the gasket 20". In this manner, "coining" of the surface 24 of the cylinder head 16 upon tightening of the bolts 18 is substantially eliminated. However, controlled compression of the gasket 20' is still maintained, the gasket 20" may be physically mounted upon and secured to the product 10 before shipment to an assembly plant and the product 10 is vibration isolated relative to the support structure or cylinder head 16 after mounting thereon by the bolts 18.

With attention now invited more specifically to FIG. 7, FIG. 7 illustrates a typical method of preassembly of a gasket sealing system relative to a product 70 corresponding to the product 10 and wherein the product 70 is mounted relative to a cylinder head 76 corresponding to the cylinder head 16.

From FIG. 7 it may be seen that this sealing assembly utilizes a special shouldered bolt 78 corresponding to the bolt 18 and a resilient grommet 80 for vibration isolation of the product 70 relative to the cylinder head 76.

With this type of sealing system controlled compression of the gasket 82 corresponding to the gasket 20 is obtained, but separate isolation grommets 80 must be used in conjunction with special shoulder bolts 78 and special assembly equipment must be utilized to assemble the bolts 78 and grommets 80 to the product 70 before shipment of the product to an assembly plant.

Thus, it may be seen that the gasket sealing systems illustrated in FIGS. 3, 4 and 6 accomplish controlled gasket compression and product vibration oscillation in a manner which is inexpensive and requires only relatively simple automated manufacturing equipment.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a component assembly for mounting against a support surface therefor and wherein said component assembly includes a first surface area to be sealed relative to said support surface and a second surface area generally paralleling said first surface area and facing in the opposite direction and said first surface area includes first bore ends opening therethrough comprising corresponding first ends of mounting bores formed through mounting flange portions of said component assembly and having second open ends remote from said first ends opening through said second surface area, a resilient, deformable material gasket overlying said surface area and including first and second sides opposing and facing away from, respectively, said first surface area and integral sleeve portions extending outwardly from said first side into said bores through said first bore ends, said sleeve portions including inner shape retentive, ductile material sleeves installed and at least frictionally retained therein, said inner sleeves including first ends generally flush with said second side and ductile second ends projecting outwardly of said second open ends of said bores and deformed over the portions of said second surface area of said component assembly surrounding said second open ends of said mounting bores, thereby physically attaching said gasket to said assembly in overlying relation to said first surface area.

2. The combination of claim 1 wherein said second side of said gasket includes integral rib areas projecting outwardly therefrom and extending along zones of said component assembly to be fluid-tight sealed relative to said support surface, those portions of said gasket equipped with said rib areas being adapted to be compressed between said first surface area and said support surface as a result of threaded fasteners being secured through said mounting bores and inner sleeves and mounting said component assembly to said support surface and with the compression of said portions of said gasket being effectively limited by the effective length of said inner sleeves through which said fasteners pass.

3. The combination of claim 1 wherein said sleeve portions project through said mounting bores and include terminal ends remote from said gasket also deformed over said surface area portions of said component assembly surrounding said second open ends of said mounting bores and clamped between the last mentioned surface area portions and said deformed second ends of said inner sleeves.

4. The combination of claim 1 wherein said sleeve portions terminate outwardly from said first side inwardly of said second open ends of said mounting bores, and resilient, deformable washer members disposed about said ductile second ends and clamped between the deformed portions thereof and said surface area portions of said component assembly surrounding said second open ends of said mounting bores.

5. The combination of claim 1 wherein said gasket includes a central carrier frame spaced between said first and second sides.

6. A gasket for use in mounting a component assembly against a support surface therefor wherein the assembly includes a first surface area to be sealed relative to said support surface and a second surface area generally paralleling and facing in a direction opposite to the direction in which said first surface area faces, said first surface area including first bore ends opening therethrough comprising corresponding first ends of mounting bores formed through said assembly and having second open ends remote from said first ends opening through said second surface area, said gasket being constructed of resilient, deformable material and including integral sleeve portions extending outward from a first side of said gasket adapted to oppose said first surface area, the outer ends of said sleeve portions being adapted to extend through said bores and including inner sleeves installed and at least frictionally retained in said sleeve portions, said inner sleeves including first ends generally flush with a second side of said gasket remote from said first side and ductile second ends at least generally flush with said outer ends and adapted to be deformed, with said outer ends, over the portions of said second surface area surrounding the second open ends of said bores in a manner to clamp the outer ends of said sleeve portions between said portions of said second surface area of said component assembly surrounding the second open ends of said bores and said ductile ends after being deformed.

7. The method of providing a sealing gasket attached to a component assembly including mounting flange portions having first and second remote, oppositely facing surfaces and mounting bores formed therethrough spaced along and opening through said first and second surfaces, said component assembly being adapted to be fluid-tight sealed relative to an opposing mounting surface of a support structure upon the mounting of said component assembly on said support structure with said first surface facing toward said mounting surface and through the utilization of threaded fasteners secured through said mounting bores and relative to said support structure; said method comprising providing a gasket of resilient, deformable material of a size and shape for disposition between said mounting surface and first surface and including first and second sides for opposing said first surface and mounting surface, respectively, and with said gasket including integral tubular nipples projecting outwardly of said first side and having outer ends, said nipples being projectable through said bores and having inner sleeves disposed and at least frictionally retained therein including first ends generally flush with said second side and ductile second ends at least generally flush with said outer ends and deformable over the areas of said second surface of said component assembly disposed about the ends of said bores remote from said first surface, applying said gasket to said component assembly with said first side opposing said first surface and said tubular nipples and inner sleeves projecting through said bores, and then deforming said ductile ends of said inner sleeves over the portions of said second surface of said component assembly surrounding said bores in a manner clamping the corresponding outer ends of said tubular nipples between said portions of said second surface and said deformed ductile ends of said inner sleeves.

* * * * *